(12) United States Patent
Liu

(10) Patent No.: US 11,768,757 B2
(45) Date of Patent: Sep. 26, 2023

(54) KERNEL DEBUGGING SYSTEM AND METHOD

(71) Applicant: Black Sesame Technologies Inc., San Jose, CA (US)

(72) Inventor: Haiying Liu, Chengdu (CN)

(73) Assignee: Black Sesame Technologies Inc., San Jose, CA (US)

( * ) Notice: Subject to any disclaimer, the term of this patent is extended or adjusted under 35 U.S.C. 154(b) by 83 days.

(21) Appl. No.: 17/686,126

(22) Filed: Mar. 3, 2022

(65) Prior Publication Data

US 2022/0283928 A1 Sep. 8, 2022

(51) Int. Cl.
*G06F 11/36* (2006.01)
*G06F 11/28* (2006.01)
*G06F 11/30* (2006.01)

(52) U.S. Cl.
CPC .......... *G06F 11/3656* (2013.01); *G06F 11/28* (2013.01); *G06F 11/3089* (2013.01)

(58) Field of Classification Search
None
See application file for complete search history.

(56) References Cited

U.S. PATENT DOCUMENTS

| | | | | |
|---|---|---|---|---|
| 7,424,418 B1* | 9/2008 | Soufi | ....................... | G06F 30/33 703/13 |
| 2002/0046364 A1* | 4/2002 | Yoshimura | ............ | G06F 11/362 714/E11.21 |
| 2005/0216895 A1* | 9/2005 | Tran | ...................... | G06F 11/362 717/127 |
| 2007/0094532 A1* | 4/2007 | Sengupta | ............ | G06F 11/3632 714/E11.207 |
| 2020/0301676 A1* | 9/2020 | Rock | ........................ | G06F 8/30 |

OTHER PUBLICATIONS

Zhou, Heyang, "Running WebAssembly on the Kernel," <https://medium.com/wasmer/running-webassembly-on-the-kernel-8e04761f1d8e>, May 16, 2019, p. 1-15. (Year: 2019).*
Hjort, Rikard, "Formally Verifying WebAssembly with KWasm," University of Gothenburg, 2020, p. 1-76. (Year: 2020).*

* cited by examiner

*Primary Examiner* — Qing Chen
(74) *Attorney, Agent, or Firm* — Timothy Wang; Ni, Wang & Massand, PLLC

(57) ABSTRACT

The present application relates to a kernel debugging system and method. The kernel debugging system includes: a user interface module, the user interface module being configured to edit program codes and output an execution result of the program codes; a compilation module, the compilation module being configured to compile the program codes into object files; and a Kwasm engine, the Kwasm engine being directly installed in a system kernel of an operating system, and being configured to interpret and execute the object files in a kernel mode, so as to obtain the execution result of the program codes. On the basis of the kernel debugging system, a user can write program codes like writing a common application program, namely, the program codes can be run and executed in a system kernel without paying attention to details of the system kernel.

9 Claims, 4 Drawing Sheets

KERNEL DEBUGGING SYSTEM AND METHOD

CROSS REFERENCE TO RELATED APPLICATION

This patent application claims the benefit and priority of Chinese Patent Application No. 202110240693.1 filed on Mar. 4, 2021, the disclosure of which is incorporated by reference herein in its entirety as part of the present application.

TECHNICAL FIELD

The present application relates to the field of software debugging, and in particular to a kernel debugging system and method.

BACKGROUND

For a Linux system, only professionals can modify and compile kernel source codes. However, if developers who are not very familiar with a kernel need to debug some functions of the kernel or read kernel data in a running state of the kernel for testing or analysis, they often need to modify and newly compile the kernel or create new kernel modules. In the case of modifying and newly compiling the kernel, a target system's kernel also needs to be updated. In the case of creating new kernel modules, it is also necessary to match the new kernel modules with the kernel source codes running on the system, and thus this method relies heavily on the kernel source codes and has high requirements for a compilation environment. Currently, common kernel debugging methods may include, for example, a method for performing kernel debugging by modifying kernel source codes, a Kgdb kernel debugging method, a Perf kernel debugging method, and a kernel ftrace function debugging method. However, these debugging methods are professional and complex, and if used improperly, they may lead to system downtime.

Therefore, it is necessary to provide a simple and easy-to-use kernel debugging system and method, so that a user can write program codes like writing a common application program, that is, the program codes can be run and executed in a system kernel without paying attention to details of the system kernel.

SUMMARY

In view of the technical problems above, the present application provides a kernel debugging system and method, so that a user can write program codes like writing a common application program, that is, the program codes can be run in a system kernel without paying attention to the details of the system kernel, and it is only necessary to know a called kernel interface.

In a first aspect of the present application, there is provided a kernel debugging system, comprising: a user interface module, the user interface module being configured to edit program codes and output an execution result of the program codes; a compilation module, the compilation module being configured to compile the program codes into object files; and a Kwasm engine, the Kwasm engine being directly installed in a system kernel of an operating system and configured to interpret and execute the object files in a kernel mode, so as to obtain the execution result.

In one implementation, the operating system is a Linux operating system.

In one implementation, the object files are object files in a 64-bit wasm format.

In one implementation, the Kwasm engine comprises: a receiving module, the receiving module being configured to receive operation instructions and forward the operation instructions to a management module, wherein the operation instructions comprise operation instructions associated with the object files; a management module, the management module being configured to provide auxiliary management of the operation instructions in response to receiving the operation instructions; an interpreting and executing module, the interpreting and executing module being configured to interpret and execute the object files in the kernel mode, so as to generate the execution result; and a sending module, the sending module being configured to send the execution result to the user interface module.

In one implementation, the interpreting and executing module is implemented on the basis of a predetermined wasm interpreter, but a lower layer interface on which the interpreting and executing module depends is configured as a kernel interface.

In one implementation, the interpreting and executing module is configured to support interpretation and execution on the object files in a 64-bit wasm format.

In one implementation, the interpreting and executing module is configured to not support a floating-point operation function.

In one implementation, the Kwasm engine further comprises a symbol table generation module, the symbol table generation module being configured to generate export function symbol tables on the basis of system symbol tables and kernel header files.

In one implementation, the auxiliary management includes: system state maintenance, file management, memory management, and message queue management.

In a second aspect of the present application, there is provided a kernel debugging method, wherein the kernel debugging method is executed by using the kernel debugging system according to the first aspect of the present application, and the kernel debugging method comprises: editing program codes via a user interface module; compiling the program codes into object files via a compilation module; and interpreting and executing the object file via a Kwasm engine in a kernel mode, and sending an execution result of the program codes to a user interface module for displaying.

DETAILED DESCRIPTION OF THE EMBODIMENTS

In order to make the objects, features, and advantages above of the present application more clearly understood, detailed illustration of specific embodiments of the present invention will be given below with reference to the accompanying drawings. In the following description, numerous specific details are stated to facilitate thorough understanding of the present invention. However, the present invention can be implemented in many other ways different from those as described herein. Those skilled in the art would make similar improvements without departing from the spirit of the present invention, and thus the present invention is not limited by the specific embodiments disclosed below.

Figure 1:
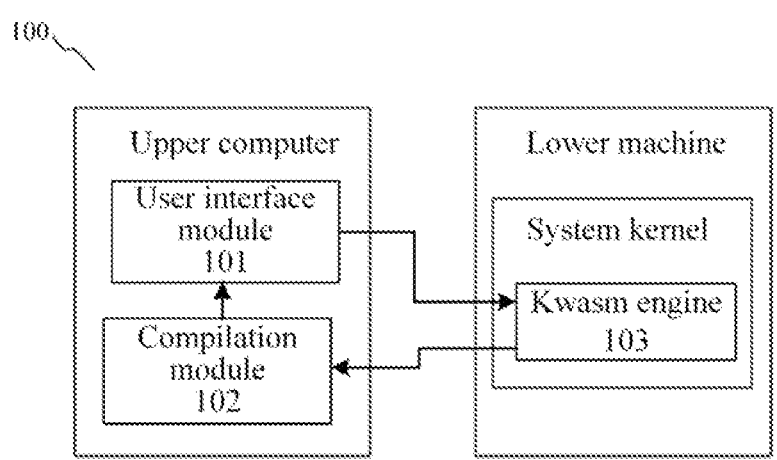
FIG. 1 shows a structural block diagram of a kernel debugging system according to an embodiment of the present application.

As shown in FIG. 1, in one embodiment, the present application provides a kernel debugging system 100. The kernel debugging system 100 includes a user interface module 101, a compilation module 102, and a Kwasm engine 103 (i.e., a WebAssembly interpreting and executing system for embedding into a kernel).

The user interface module 101 is configured to edit program codes (for example, program codes written in C language), and output an execution result of the program codes. In one implementation, the user interface module 101 may be a user interface for displaying and editing program codes written by a developer, and displaying a corresponding execution result. It is worth mentioning that in this article, editing program codes may refer to writing or modifying program codes, including inputting new program codes or modifying program codes that have been previously inputted, etc.

The compilation module 102 is configured to compile the program codes into object files. Currently, most central processing units (CPUs) are of 64-bit, and the corresponding system kernels (e.g., Kernel) are also within 64-bit address ranges, and thus in one implementation, the object files are configured as object files of a 64-bit wasm format (WebAssembly format), so as to ensure that an operation of wasm codes accessing a kernel interface can be executed correctly. In one implementation, a compiler of Clang 12.0 or higher versions may be used to compile the object files in a 64-bit wasm format. It should be understood that Clang is a lightweight compiler for C language, C++, and Objective-C language. Of course, in the present application, other compilers may also be used as long as they can compile program codes into object files of a desired format.

In the present application, the Kwasm engine 103 is implemented as a service directly installed in a system kernel, and is configured to interpret and execute the object files in a kernel mode, so as to obtain the execution result of the program codes. The Kwasm engine 103 will be described in further detail below in conjunction with FIG. 2. In this application, the kernel mode is actually relative to a user mode. In particular, the kernel mode means that a central processing unit (CPU) of an electronic device runs at a higher privilege level, has higher system authority, and can operate more system resources, such as an interrupt vector table, a special register, etc.; while the user mode means that the central processing unit runs at the lowest privilege level, for example, a common application program runs in the user mode. When it is necessary to operate system resources, a program at a user mode needs to enter a kernel mode through calling of an operating system, and an interface provided by the kernel realizes operation of specified resources.

In one implementation, as shown in FIG. 1, both the user interface module 101 and the compilation module 102 are implemented in an upper computer, and the Kwasm engine 103 is directly installed in a system kernel of an operating system (for example, a Linux system) on a lower computer (or a target computer). In the present application, the upper computer refers to an electronic device for sending an operation command, and the lower computer refers to an electronic device for processing the operation command. An operating system such as a Linux system is generally installed on the lower computer. In this application, the electronic device may represent various forms of digital computers, such as laptops, desktops, workstations, personal digital assistants, servers, blade servers, mainframe computers, and other suitable computers. The electronic device may also represent various forms of mobile apparatuses, such as personal digital assistants, cell phones, smart phones, wearable devices, and other similar computing apparatuses. Although in FIG. 1, the user interface module 101 and the compilation module 102 are shown as being implemented in the upper computer and the Kwasm engine 103 is shown as being directly installed in the lower computer, it should be understood that the user interface module 101, the compilation module 102, and an operating system in which the Kwasm engine 103 is installed may also be implemented in the same electronic device without departing from the scope claimed in the present application.

Figure 2:
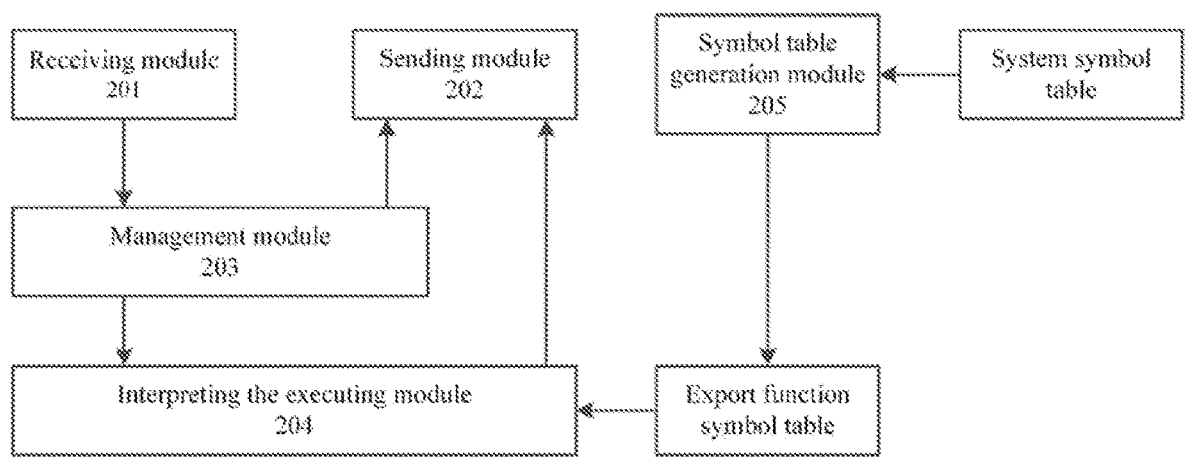
FIG. 2 shows a schematic structural diagram of a Kwasm engine according to an embodiment of the present application.

As shown in FIG. 2, in one embodiment, the Kwasm engine 103 may include a receiving module 201, a sending module 202, a management module 203, and an interpreting and executing module 204.

The receiving module 201 is configured to receive operation instructions, and forward the operation instructions to the management module 203, wherein the operation instructions include operation instructions associated with the object files. Specifically, in the present application, the operation instructions may include executing the object files, querying which object files are present in the Kwasm engine, transmitting the object files, and so on. In one implementation, the receiving module 201 may be connected to the upper computer via a communication interface such as a serial interface, a USB interface, or a network interface, so as to receive the object files sent by the upper computer. The receiving module 201 may be configured to receive, at a self-defined communication field, the object files from the upper computer via a protobuf (Google Protocol Buffers) communication protocol. In this application, the self-defined communication field can be used to distinguish different operation instructions (for example, to distinguish different communication functions between the upper computer and the Kwasm engine), such that the Kwasm engine may know whether the operation instructions are, for example, to execute a certain wasm64 object file, or to query which wasm 64 object files are present in the Kwasm engine, or to simply transmit a certain wasm 64 object file, and so on. It should be understood that the protobuf communication protocol is a communication protocol that can convert interface data structures across languages/machines, and it is more mature and universal, and occupies a low bandwidth. Of course, the receiving module 201 may also be configured to receive the object files from the upper computer via other communication protocols, for example, in a JSON format.

The sending module 202 is configured to send the execution result of the program codes to the user interface module 101. In one implementation, the sending module 202 may also be connected to the upper computer via a communication interface such as a serial interface, a USB interface or a network interface, so as to send the corresponding execution result to the upper computer, for displaying by the user interface module 101. The sending module 202 may be configured to send the execution result to the upper computer via the protobuf communication protocol. It is worth mentioning that when the length of a data packet of the execution result to be sent is too long (for example, exceeding a sending limit of a communication interface (for example, a serial interface, a USB interface, or a network interface)), the sending module 202 may further divide the data packet into a plurality of pieces for sending.

It is worth mentioning that although the receiving module 201 and the sending module 202 are depicted as two separate modules in FIG. 2, it should be understood that the receiving module 201 and the sending module 202 may also be integrated in the same module without departing from the scope of protection of the present application.

Figure 3:
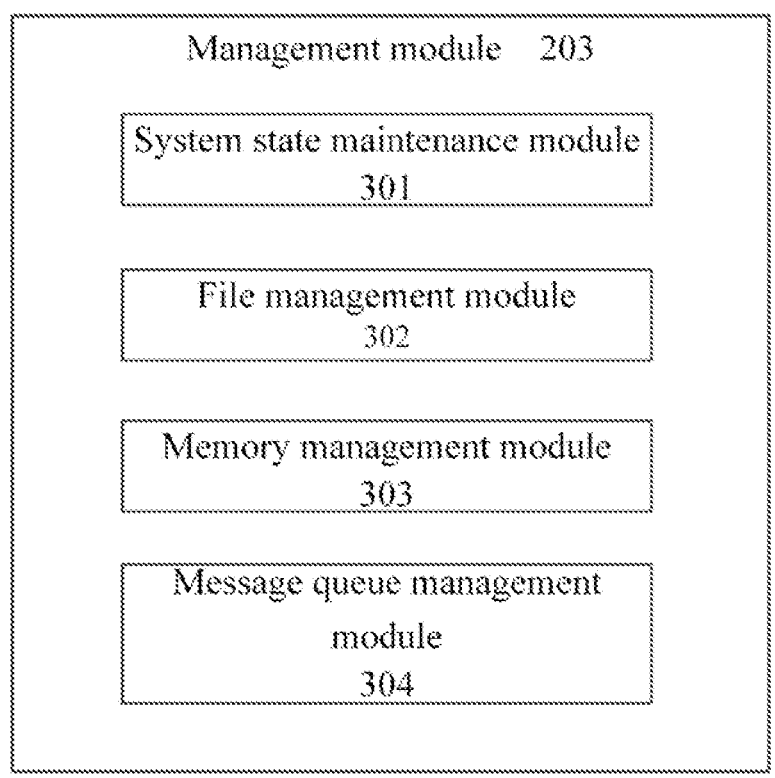
FIG. 3 shows a structural block diagram of a management module according to an embodiment of the present application.

The management module 203 is configured to provide auxiliary management of the operation instructions in response to receiving the operation instructions. In one implementation, the auxiliary management may include system state maintenance, file management, memory management, and message queue management. Thus, as shown in FIG. 3, in one embodiment, the management module 203 may correspondingly include a system state maintenance module 301, a file management module 302, a memory management module 303, and a message queue management module 304.

The system state maintenance module 301 is configured to perform system state management functions, which may specifically include initializing the Kwasm engine when the Kwasm engine is started in response to receiving a corresponding operation instruction, releasing resources of the Kwasm engine when the Kwasm engine is exited in response to receiving a corresponding operation instruction, and maintaining the state of the Kwasm engine while the Kwasm engine is running.

The file management module 302 is configured to perform file management functions, which may specifically include issuing the object files to the Kwasm engine in response to a corresponding operation instruction, that is, issuing the object files to a specified directory of the operating system for storing (for example, as an example only, the specified directory may be/home/kwasm/), such that the Kwasm engine can read the object files from the directory and execute same. It is worth mentioning that once the object files are issued to the specified directory of the operating system for storing, the object files can be repeatedly executed by the Kwasm engine without re-issuing before each execution. The file management may also include reading, deleting, querying, etc. of the issued object files in response to corresponding operation instructions.

As the number of export function symbol tables is large and not fixed, when the export function symbol tables are generated, memory resources generally need to be dynamically expanded, and a lot of scattered memories will be applied for, for example, for storing symbol names. Usually, the lengths of different symbol names are different. Hereinafter, the export function symbol tables are described in more detail in connection with a symbol table generation module 205. Therefore, in the present application, the memory management module 303 is configured to mainly perform the following memory management functions: providing a memory pool function for dynamically allocating the required memory and managing the allocated memory in a centralized manner, so as to ensure effective use and release of resources.

The message queue management module is configured to perform a message queue management function, which may specifically include, after receiving operation instructions from the receiving module 201, storing the operation instructions in a message queue, so that a main thread of the Kwasm engine can guard the message queue of the operation instructions. Such a guard may be, for example, after arrival of the operation instructions, processing the operation instructions differently according to the ID of the operation instructions, for example, operation instructions for deleting files are provided to the file management module for execution, and operation instructions for executing the object files are provided to the interpreting and executing module 204 for execution.

The interpreting and executing module 204 is configured to interpret and execute the object files in a kernel mode to generate a corresponding execution result. In one implementation, the interpreting and executing module is implemented on the basis of a predetermined wasm interpreter, but a lower layer interface on which the interpreting and executing module depends is configured as a kernel interface. In this application, the predetermined wasm interpreter may be any existing wasm interpreters (e.g., an open source wasm interpreter), or may be a wasm interpreter to be developed in the future. It should be understood that the existing open source wasm interpreter is a program running in a user mode and cannot be directly embedded into the system kernel of an operating system, that is, it cannot be directly installed in the system kernel. In order to enable the open source wasm interpreter to be directly installed in the system kernel, the present application makes substantial improvements on this basis, thereby implementing the interpreting and executing module 204.

In one aspect, by improving the existing open source wasm interpreter, the lower layer interface on which the finally-achieved interpreting and executing module 204 depends is configured as a kernel interface. Open source wasm interpreters usually execute in a user mode, and most of the lower layer interfaces on which they depend are basic libraries such as libc. However, the system kernel of an operating system does not support this basic library of user mode. Therefore, the interpreting and executing module 204 according to the embodiments of the present application removes the dependence of the open source wasm interpreter on such a basic library, and changes the dependent lower layer interfaces (for example, all C library interfaces) to corresponding interfaces provided by the system kernel (i.e., kernel interfaces). In one situation, in cases where the kernel system includes a corresponding kernel interface, the lower layer interface can be directly replaced with the kernel interface, for example, a malloc (a memory allocation interface provided by a C standard library) function is directly changed to vmalloc (a memory allocation interface provided by a kernel), and free (a memory free interface of a C library) is directly changed to vfree (a memory free interface provided by the kernel). In another situation, in cases where the kernel system does not include a corresponding kernel interface, the lower layer interface can be developed and adapted, that is, a corresponding kernel interface is re-developed, for example, open is an interface for opening a file provided by the C library, but in the kernel, if there is no corresponding interface, known interfaces provided by the kernel can be combined as an interface having an open function.

On the other hand, by improving the existing open source wasm interpreter, the finally-achieved interpreting and executing module 204 is configured to support interpretation and execution of object files in a 64-bit wasm format. Existing open source interpreters only support a 32-bit wasm file format, but a system kernel typically runs on a 64-bit central processing unit (CPU). That is to say, the address space of the system kernel is 64-bit, and thus the existing open source wasm interpreter cannot access the kernel address of the system kernel. Therefore, the open source interpreter needs to be modified to support the 64-bit wasm format, so that the kernel interface can be used normally. To modify the open source interpreter to support the 64-bit wasm format, all operations on the address can be changed to be processed according to 64 bits, for example, the length of a read address is extended to 64 bits, the storage type is to store according to a (4-bit space, and the parts (mainly various pointer types) which are fixedly identified as 32 bits in an original interpreter are processed according to 64 bits. For example, by way of example only, in the case of address processing, a calculation method of I32 can be modified to a calculation method of I64, which can be specific to various aspects such as extending the length of a read wasm64 bytecode, instructing to update a push address, instructing to update a pop address, and parameter transfer.

In yet another aspect, by improving the existing open source wasm interpreter, the finally-achieved interpreting and executing module is also configured to not support a floating-point operation function. The system kernel does not support floating-point operations, and thus all functions related to floating points in the existing open source wasm interpreter need to be deleted, and corresponding floating-point instructions are all set to not support.

With continued reference to FIG. 2, in an embodiment, the Kwasm engine 103 may further include a symbol table generation module 205. The symbol table generation module 205 is configured to generate export function symbol tables on the basis of system symbol tables and kernel header files. The export function symbol tables are correspondence tables between interface functions exported from the kernel and actual kernel addresses when the system is running, and thus through the export function symbol tables, a kernel export function (i.e., an interface function defined in kernel codes) to be called can be quickly found in the process of executing the object files. The kernel header files refers to header files generated during compilation of the system kernel, and may contain function prototype definitions. i.e., function definitions that may be provided by the kernel and for calling by a user. The system symbol tables refers to actual symbol tables generated in the operating system after the system kernel runs, and each symbol table only contains the name and address of the function and the symbol type. The symbol table generation module 205 can match the system symbol tables and the kernel header files to generate final export function symbol tables. In one implementation, the export function symbol tables are tables of all items each having three elements, the three elements are respectively: a. name of function (i.e., the name of the kernel export function), b. memory mapping address of function (i.e., an internal parameter mapping address of the kernel export function), and c. function prototype (i.e., a prototype definition of the kernel export function). In the process of the interpreting and executing module 204 interpreting and executing an object file, if a corresponding kernel function needs to be called, the export function symbol tables will be queried, so as to map a kernel function referenced in the object file to a specific memory address (including transferring relevant actual parameters to the kernel function at the memory address), and to skip to code segments of the kernel function for execution, thereby realizing calling of the kernel function (i.e. an interface function exported from the kernel).

By installing the Kwasm engine in the system kernel, it is equivalent to opening a window in the system kernel, so that a developer can simply and conveniently debug the system kernel without paying attention to details of the system kernel, thereby facilitating increasing the efficiency of kernel debugging.

Figure 4:
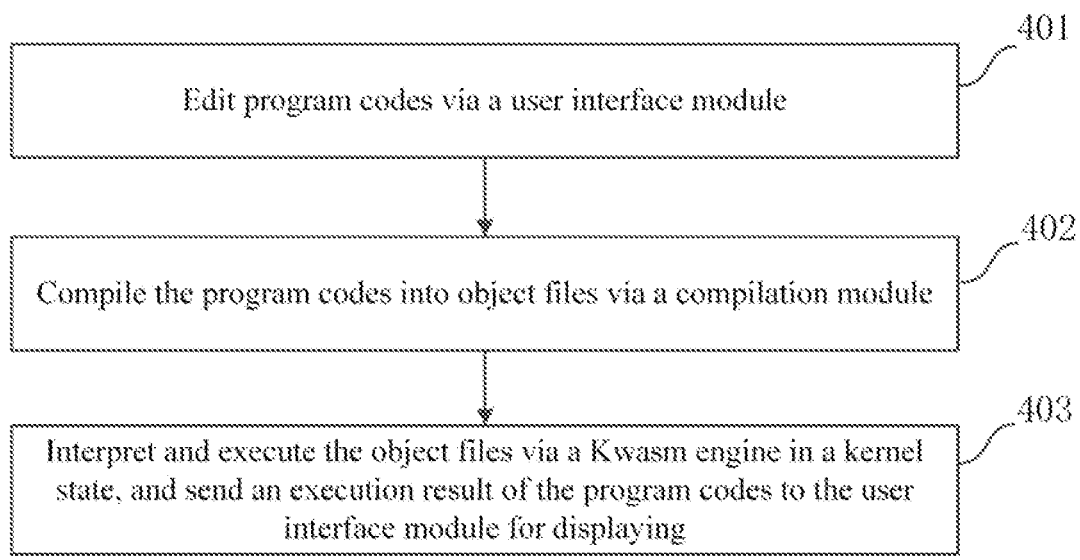
FIG. 4 shows a flowchart of a kernel debugging method according to an embodiment of the present application.

As shown in FIG. 4, in one embodiment, the present application further provides a kernel debugging method, the kernel debugging method being implemented by using the kernel debugging system above. Specifically, the kernel debugging method may include steps 401-403.

At step 401, program codes are edited via a user interface module (e.g., program codes inputted by a developer on the user interface module).

At step 402, the program codes are compiled into object files by using a compilation module.

At step 403, the object files are interpreted and executed via a Kwasm engine in a kernel mode, and an execution result of the program codes is sent to the user interface module for displaying. As described above, the Kwasm engine is installed in the system kernel, and thus in this method, the object files are actually running in a kernel mode, and therefore can call interface functions exported by the kernel in a running process.

It can be determined from the process above that the operation process of the kernel debugging method of the present application is simple and easy to use, and a developer only needs to input test codes on the user interface module to make the test codes run in the system kernel, thereby greatly increasing the efficiency of debugging kernel codes.

The embodiments above only represent several embodiments of the present application, and the description thereof is specific and detailed, but shall not be construed as limiting the patent scope of the invention. It should be pointed out that those of ordinary skill in the art would make several modifications and improvements without departing from the spirit of the present application. These are all within the scope of protection of the present application. Accordingly, the scope of protection of this patent application shall be determined by the appended claims.

What is claimed is:

1. A kernel debugging system, comprising:
a user interface module, the user interface module being configured to edit program codes and output an execution result of the program codes;
a compilation module, the compilation module being configured to compile the program codes into object files; and
a Kwasm engine, the Kwasm engine being directly installed in a system kernel of an operating system and configured to interpret and execute the object files in a kernel mode, so as to generate an execution result of the object files, wherein the Kwasm engine comprises:
a receiving module, the receiving module being configured to receive operation instructions and forward the operation instructions to a management module, wherein the operation instructions comprise operation instructions associated with the object files;
a management module, the management module being configured to provide auxiliary management of the operation instructions in response to receiving the operation instructions by the receiving module;
an interpreting and executing module, the interpreting and executing module being configured to interpret and execute the object files in the kernel mode, so as to generate the execution result of the object files; and a sending module, the sending module being configured to send the execution result of the object files to the user interface module.

2. The kernel debugging system according to claim 1, wherein the operating system is a Linux operating system.

3. The kernel debugging system according to claim 1, wherein the object files are object files in a 64-bit wasm format.

4. The kernel debugging system according to claim 1, wherein the interpreting and executing module is implemented on the basis of a predetermined wasm interpreter, but a lower layer interface on which the interpreting and executing module depends is configured as a kernel interface.

5. The kernel debugging system according to claim 4, wherein the interpreting and executing module is further configured to support interpretation and execution of the object files in a 64-bit wasm format.

6. The kernel debugging system according to claim 4, wherein the interpreting and executing module is further configured to not support a floating-point operation function.

7. The kernel debugging system according to claim 1, wherein the Kwasm engine further comprises a symbol table generation module, the symbol table generation module being configured to generate export function symbol tables on the basis of system symbol tables and kernel header files.

8. The kernel debugging system according to claim 1, wherein the auxiliary management of the operation instructions comprises system state maintenance, file management, memory management, and message queue management.

9. A kernel debugging method, wherein the kernel debugging method is executed by using the kernel debugging system according to claim 1, and the kernel debugging method comprising:
- editing program codes and outputting an execution result of the program codes via a user interface module;
- compiling the program codes into object files via a compilation module;
- interpreting and executing the object files in a kernel mode via a Kwasm engine being directly installed in a system kernel of an operating system; and
- generating an execution result of the object files, wherein generating the execution result of the object files comprises:
  - receiving operation instructions and forward the operation instructions to a management module, wherein the operation instructions comprise operation instructions associated with the object files;
  - providing auxiliary management of the operation instructions in response to receiving the operation instructions by the receiving module;
  - interpreting and executing the object files in the kernel mode, so as to generate the execution result of the object files; and
  - sending the execution result of the object files to the user interface module.

* * * * *